(12) United States Patent
Park

(10) Patent No.: US 7,756,149 B2
(45) Date of Patent: Jul. 13, 2010

(54) ETHERNET SWITCH AND ROUTER FOR UNSHIELDED TWISTED PAIR/OPTICAL INTEGRATED NETWORK AND FRAME PROCESSING METHOD THEREOF

(75) Inventor: Il-Bum Park, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 692 days.

(21) Appl. No.: 11/604,288

(22) Filed: Nov. 27, 2006

(65) Prior Publication Data

US 2007/0147340 A1 Jun. 28, 2007

(30) Foreign Application Priority Data

Dec. 27, 2005 (KR) .................. 10-2005-0130888

(51) Int. Cl.
*H04L 12/56* (2006.01)
*H04J 1/16* (2006.01)
(52) U.S. Cl. .................. 370/419; 370/252; 370/389
(58) Field of Classification Search .................. 370/351, 370/252, 419, 389
See application file for complete search history.

(56) References Cited

U.S. PATENT DOCUMENTS

| | | | |
|---|---|---|---|
| 6,681,261 B2* | 1/2004 | Mancusi et al. | 709/250 |
| 6,980,564 B1* | 12/2005 | Rodriguez et al. | 370/466 |
| 7,149,397 B2* | 12/2006 | Popovic et al. | 385/134 |
| 7,391,771 B2* | 6/2008 | Orava et al. | 370/389 |
| 2002/0006137 A1* | 1/2002 | Rabenko et al. | 370/466 |
| 2005/0114710 A1* | 5/2005 | Cornell et al. | 713/201 |

FOREIGN PATENT DOCUMENTS

| | | |
|---|---|---|
| KR | 2000-0061019 | 10/2000 |
| KR | 10-2001-0019616 | 3/2001 |
| KR | 2003-0054226 | 7/2003 |
| KR | 10-2004-0106856 | 12/2004 |
| KR | 10-2005-0034250 | 4/2005 |

OTHER PUBLICATIONS

Korean Decision of Grant corresponding to Korean Patent Application No. 2005-0130888, issued on May 7, 2007.

* cited by examiner

*Primary Examiner*—John Pezzlo
(74) *Attorney, Agent, or Firm*—H.C. Park & Associates, PLC

(57) ABSTRACT

An Ethernet switch/router for an unshielded twisted pair (UTP)/optical integrated network comprises: at least one physical chip for physical-layer processing the frame; at least one media module connected to at least one kind of media; and at least one cage having a socket connected to a corresponding physical chip via a signal bus, and connecting the media module to the physical chip via the signal bus when the media module is mounted.

12 Claims, 6 Drawing Sheets

ETHERNET SWITCH AND ROUTER FOR UNSHIELDED TWISTED PAIR/OPTICAL INTEGRATED NETWORK AND FRAME PROCESSING METHOD THEREOF

CLAIM OF PRIORITY

This application makes reference to, incorporates the same herein, and claims all benefits accruing under 35 U.S.C.§119 from an application for ETHERNET SWITCH AND ROUTER FOR UNSHIELDED TWISTED PAIR/OPTICAL COMBINATION NETWORK AND METHOD OF FRAME PROCESSING THEREFOR earlier filed in the Korean Intellectual Property Office on the 27 Dec. 2005 and there duly assigned Serial No. 10-2005-0130888.

BACKGROUND OF THE INVENTION

1. Technical Field

The present invention relates to an Ethernet switch/router for an unshielded twisted pair (UTP)/optical integrated network and a frame processing method thereof.

2. Related Art

Ethernet switches for switching a frame in a network or routers for forwarding a frame may be classified into fast Ethernet supporting ones and Gigabit Ethernet supporting ones.

As Gigabit Ethernet has recently been commercialized, a need has developed for an Ethernet switch or a router (hereinafter, Ethernet switch/router) which can accommodate existing fast Ethernet switches/routers, as well as Gigabit Ethernet-based Ethernet switches/routers.

The existing fast Ethernet-based Ethernet switch/router comprises: an RJ-45 connector connected to a physical layer of a fast Ethernet network, i.e., an unshielded twisted pair (UTP) cable network; a transformer for transforming a voltage of a signal received from the UTP cable network; a physical chip for processing a frame in the physical layer; and a media access control (MAC) chip for switching or forwarding a fame.

The existing Gigabit Ethernet-based switch/router comprises an optical module mounted on a printed circuit board (PCB) for connection to an external device via an optical cable for converting an optical signal into an electrical signal, a physical chip for processing a frame in the physical layer, and a MAC chip for switching or forwarding a frame.

The existing fast Ethernet-based switch/router and the existing Gigabit Ethernet-based switch/router differ in terms of the media interface of the physical chip. That is, the existing fast Ethernet-based switch/router has a UPT cable as the media interface of the physical chip, while the existing Gigabit Ethernet-based switch/router has an optical cable as the media interface of the physical chip. For the foregoing reason, a single Ethernet switch/router cannot accommodate both fast Ethernet and Gigabit Ethernet, and each Ethernet switch/router has been designed to support only one media.

More specifically, connecting the UTP cable using the RJ-45 connector in the fast Ethernet-based switch/router requires a transformer to transform a voltage of the cable signal, and all pins of the RJ-45 connector need to be connected to the physical chip in order to support 1000 BASE-TX.

On the other hand, connecting the optical cable using the optical module in the Gigabit Ethernet-based switch/router does not require a transformer because signal exchange is made in a different signal form. However, the optical module should be able to support transmission speeds of BASE-FX and 1000BASE-FX.

In order to accommodate both the fast Ethernet and the Gigabit Ethernet, a separate media converting device for matching the UPT cable and the optical cable should be additionally implemented in the Ethernet switch/router.

SUMMARY OF THE INVENTION

It is, therefore, an object of the present invention to provide an Ethernet switch/router for an unshielded twisted pair (UTP)/optical integrated network and a frame processing method thereof which can accommodate both a UTP cable and a optical cable without using a separate media converting device for matching the UTP cable and the optical cable, and without requiring a transmission speed dependent on a cable type.

One aspect of the present invention provides an Ethernet switch/router for a UTP/optical integrated network for switching or forwarding a frame, comprising: at least one physical chip for physical-layer processing the frame; at least one media module connected to at least one kind of media; and at least one cage having a socket connected to a corresponding physical chip via a signal bus, and connecting the media module to the physical chip via the signal bus when the media module is mounted.

The physical chip generates interrupt-informing type information of the media module and identification information of the corresponding cage when the media module is mounted in the cage.

The Ethernet switch/router further comprises: a central processing unit (CPU) for transmitting an operation-related register according to identification information of the cage and type information of the media module mounted in the cage; and a bus switch for switching the signal bus, through which the operation-related register is transferred, to the corresponding cage according to the identification information of the cage.

The media module may be either an FX media module connecting to a media of the 100/1000 BASE-TX type or a TX media module connecting to a media of the 10/100/1000 BASE-TX type.

The TX media module preferably converts a signal received from the media of the 10/100/1000 BASE-TX type into a signal to be transmitted to the media of the 100/1000 BASE-TX type.

The media module and the physical chip may be connected via an optical interface.

The physical chip may identify a speed with which to exchange a frame with an external device to which the mounted media module forms an Ethernet link so as to determine a speed of a media access control (MAC) interface connected to the MAC chip.

Another aspect of the present invention provides an Ethernet switch/router for a UTP/optical integrated network for switching or forwarding a frame, comprising: at least one cage having a socket connected to a MAC chip via a signal bus, and allocated unique identification information; at least one media module connected to the MAC chip via a MAC interface, and connected to at least one kind of media when mounted in the cage; a CPU for transmitting identification information of the cage and an operation-related register according to the type of media module when the media module is mounted in the cage; and a bus switch for switching a signal bus, through which the operation-related register is transferred, to the corresponding cage according to the identification information of the cage.

The media module comprises a physical layer module for physical-layer processing a frame to be exchanged via the cable network.

The physical layer module preferably identifies a speed with which to exchange a frame with an external device to which an Ethernet link is connected so as to determine a speed of a MAC interface connected to the MAC chip.

Still another aspect of the present invention relates to a frame processing method in an Ethernet switch/router for switching or forwarding a frame in a UTP/optical integrated network, the method comprising the steps of: mounting at least one media module, connected to at least one kind of media, on each cage; setting-up a MAC interface corresponding to a frame exchange speed when the media connected via the media module is a UTP cable network; converting, by means of the media module, a signal received from the UTP cable network into an optical signal; and switching or forwarding a frame received from the media module.

The frame processing method further comprises the steps of: generating an interrupt-informing type information of the mounted media module and identification information of the cage; transmitting, by means of a central processing unit (CPU), an operation-related register according to the type information and the identification information to a bus switch; and switching, by means of the bus switch, a signal bus to a cage corresponding to the identification information so as to transmit the operation-related register to a corresponding media module.

In the step of mounting the media module, either an FX media module connected to a 100/1000 BASE-FX type media or a TX media module connected to a 10/100/1000 BASE-TX type media may be mounted in the cage.

In the step of converting the signal, a signal received from the 10/100/1000 BASE-TX type media may be converted into a signal to be transmitted to the 100/1000BASE-FX type media.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Hereinafter, exemplary embodiments of the present invention will be described in detail with reference to the accompanying drawings. In the following description, a detailed description of known functions and configurations incorporated herein has been omitted for conciseness.

Figure 1:
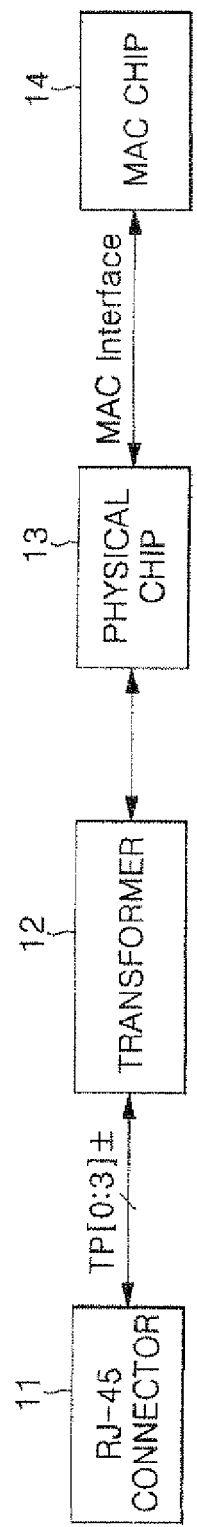
FIG. 1 is a block diagram of a fast Ethernet-based Ethernet switch/router.

FIG. 1 is a block diagram of a fast Ethernet-based Ethernet switch/router.

Referring to FIG. 1, the fast Ethernet-based Ethernet switch/router comprises an RJ-45 connector 11 connected to a physical layer of a fast Ethernet network, i.e., an unshielded twisted pair (UTP) cable network, a transformer 12 for transforming a voltage of a signal received from the UTP cable network, a physical chip 13 for processing a frame in the physical layer, and a media access control (MAC) chip 14 for switching or forwarding a fame.

Figure 2:
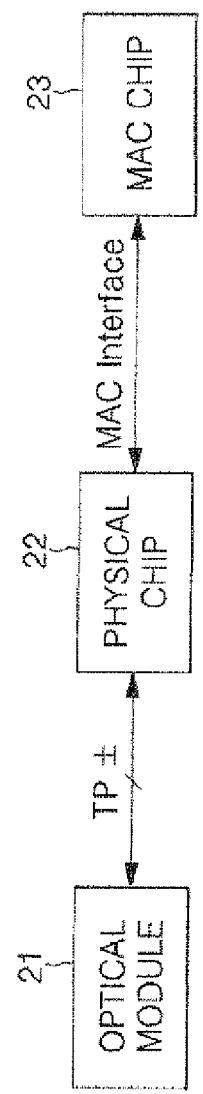
FIG. 2 is a block diagram of a Gigabit Ethernet-based switch/router.

FIG. 2 is a block diagram of a Gigabit Ethernet-based switch/router.

Referring to FIG. 2, the Gigabit Ethernet-based switch/router comprises an optical module 21 mounted on a printed circuit board (PCB) for connection to an external device via an optical cable for converting an optical signal into an electrical signal, a physical chip 22 for processing a frame in the physical layer, and a MAC chip 23 for switching or forwarding a frame.

As shown in FIGS. 1 and 2, the fast Ethernet-based switch/router and the Gigabit Ethernet-based switch/router differ in terms of the media interface of the physical chip. That is, the fast Ethernet-based switch/router has a UPT cable as the media interface of the physical chip, while the Gigabit Ethernet-based switch/router has an optical cable as the media interface of the physical chip. For the foregoing reason, a single Ethernet switch/router cannot accommodate both fast Ethernet and Gigabit Ethernet, and each Ethernet switch/router has been designed to support only one media.

That is, connecting the UTP cable using the RJ-45 connector 11 in the fast Ethernet-based switch/router requires the transformer 12 to transform a voltage of the cable signal, and all pins of the RJ-45 connector 11 need to be connected to the physical chip 13 in order to support 1000 BASE-TX.

On the other hand, connecting the optical cable using the optical module 21 in the Gigabit Ethernet-based switch/router does not require the transformer 12 because signal exchange is made in a different signal form. However, the optical module 21 should be able to support transmission speeds of 100 BASE-FX and 1000BASE-FX.

Figure 3:
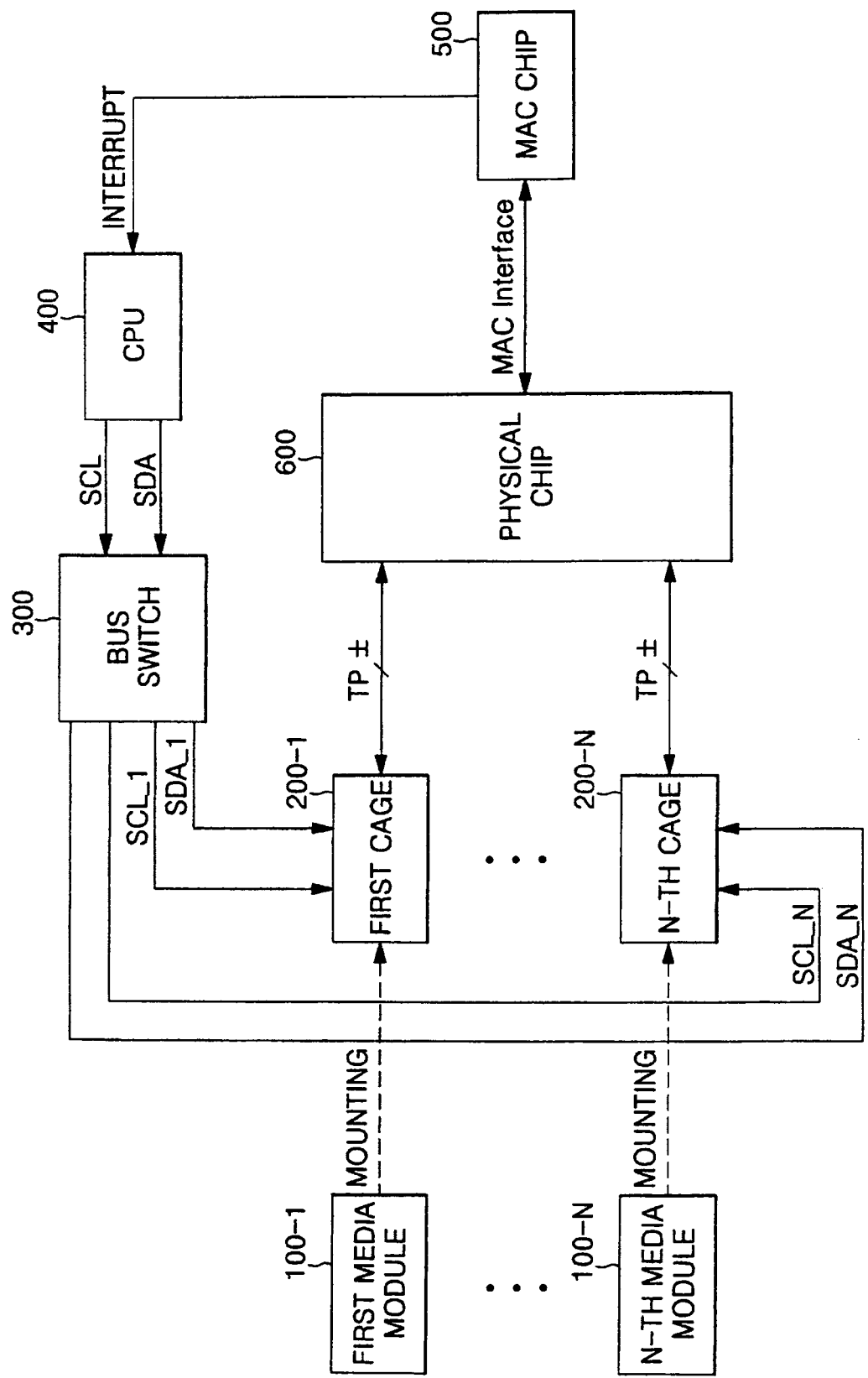
FIG. 3 is a block diagram of an Ethernet switch/router for the unshielded twisted pair (UTP)/optical integrated network according to an exemplary embodiment of the present invention.

FIG. 3 is a block diagram of an Ethernet switch/router for the unshielded twisted pair (UTP)/optical integrated network according to an exemplary embodiment of the present invention.

Referring to FIG. 3, an Ethernet switch or a router according to the present invention (i.e., an Ethernet switch/router) comprises a plurality of cages 200, a plurality of media modules 100-1 to 100-N which may be mounted in the plurality of cages 200-1 to 200-N, a bus switch 300, a central processing unit (CPU) 400, a MAC chip 500, and a physical chip 600.

Each of the media modules 100-1 to 100-N may comprise a TX media module which can connect with a UTP cable network, and an FX media module which can connect with an optical cable network.

The FX media module is a Small From Factor Pluggable (SFP) module which is able to support 100/1000 BASE-FX, and the TX media module is an SFP module which is able to support 10/100/1000 BASE-TX.

The TX media module converts a signal of 10/100/1000 BASE-TX level into a signal of 1000 BASE-FX level. That is, the TX media module converts an electrical signal received from the UTP cable network into an optical signal, and transmits it to an optical interface TP.

Each media module 100-1 to 100-N is connected to the physical chip 600 via the optical interface TP. That is, an FX media module 100-1 to 100-N is connected to the optical cable, and is connected to the physical chip 600 via the optical interface TP. An TX media module 100-1 to 100-N is connected to the physical chip 600 via the optical interface because a signal is converted from 10/100/1000 BASE-TX type to 1000 BASE-FX type.

The TX media module 100-1 to 100-N is mounted in the cage 200-1 to 200-N when an operator of the Ethernet switch/router wants a connection with the UTP cable and the FX media module 100-1 to 100-N is mounted in the cage 200-1 to 200-N when the operator wants a connection with the optical cable.

Each cage 200-1 to 200-N is disposed on the printed circuit board (PCB) of the Ethernet switch/router so that each media module 100-1 to 100-N is detachably mounted therein. Each cage 200-1 to 200-N, which is disposed on the PCB, has a socket which is connected to the physical chip 600 via a signal bus. Accordingly, when each media module 100-1 to 100-N is mounted in the cage 200-1 to 200-N, a contact terminal of the media module 100-1 to 100-N is inserted into the socket of the cage 200-1 to 200-N and is connected to the physical chip 600 and the MAC chip 500.

The physical chip 600 performs physical layer processing to transmit a received frame from the physical layer to the MAC layer, and the MAC chip 500 switches or forwards the frame. The physical chip 600 is arranged so as to be equal to the number of the cages 200-1 to 200-N, and each physical chip 600 is connected to the medial module 100-1 to 100-N mounted in the corresponding cage 200-1 to 200-N via the signal bus.

The Ethernet switch/router serves as an Ethernet switch when the MAC chip 500 switches the frame in a data link layer which is layer 2 of an open systems interconnection (OSI) layer, and it serves as a router when the MAC chip 500 forwards the frame in a network layer which is layer 3.

The MAC interface between the physical chip 600 and the MAC chip 500 may be an interface such as a Gigabit media independent interface (GMII), a reduced Gigabit media independent interface (RGMII), a ten bit interface (TBI), a serial Gigabit media independent interface (SGMII), and Ser/Des.

The CPU 400 transmits an operation-related register to each media module 100-1 to 100-N or manages the media module when the media module 100-1 to 100-N is mounted in the cage 200-1 to 200-N.

In other words, when unique identification information is allocated to each cage 200-1 to 200-N and the media module 100-1 to 100-N is mounted in the cage 200-1 to 200-N, the physical chip 600 and the MAC chip 500 generate an interrupt to provide type information of the media module 100-1 to 100-N, which is mounted in the cage 200-1 to 200-N with an Ethernet link established to the media module 100-1 to 100-N, and the identification information of the cage 200-1 to 200-N The CPU 400 identifies the type information of the mounted media module 100-1 to 100-N through the interrupt, i.e., it determines whether the mounted media module 100-1 to 100-N is an FX-media module or a TX media module, and then transmits the operation-related register of the media module 100-1 to 100-N.

The Ethernet switch/router comprises a storage unit (not shown), such as an electrically erasable and programmable read only memory (EEPROM), which stores characteristic information and operation-related register information of the TX media module and the FX media module. The CPU 400 reads the operation-related register dependent on the type of the media module 100-1 to 100-N mounted in the cage 200-1 to 200-N from the storage unit, and transmits it to the media module 100-1 to 100-N.

In this case, the CPU 400 transmits a set-up message containing the received identification information of the cage 200-1 to 200-N and address information and operation-related register of the media module 100-1 to 100-N to the bus switch 300, and the bus switch 300 switches an I2C type bus according to the identification information of the cage 200-1 to 200-N so that the operation-related register is transmitted to the media module 100-1 to 100-N.

That is, the bus switch 300 is connected to each cage 200-1 to 200-N via the bus, and performs a switching operation to connect the buses between the cage 200-1 to 200-N corresponding to the received identification information and the CPU 400 so that the operation-related register received from the CPU 400 can be transmitted to the mounted media module 100-1 to 100-N.

In this regard, the buses switched by the bus switch 300 include a clock bus (SCL) for transferring a clock signal to CPU 400, and a data bus (SDA) for transferring data.

For example, when the same bus address information is allocated to a plurality of media modules 100-1 to 100-N to be mounted in each cage 200-1 to 200-N, and the media modules 100-1 to 100-N are mounted on the Ethernet switch/router, the CPU 400 may not transmit the operation-related register to each media module 100-1 to 100-N or may not manage it. Accordingly, the unique identification information is allocated to each cage 200-1 to 200-N, the physical chip 600 and the MAC chip 500 transmit the identification information and the type information of the media module 100-1 to 100-N mounted in the cage 200-1 to 200-N to the CPU 400 through the interrupt, and the CPU 400 transmits the operation-related register to the corresponding media module through the bus switch 300 using the identification information of the cage 200-1 to 200-N in which the media module 100-1 to 100-N is mounted.

When the TX media module 100-1 to 100-N is mounted in the cage 200-1 to 200-N, the physical chip 600 determines the interface with the MAC chip 500 through automatic negotiation.

Figure 4:
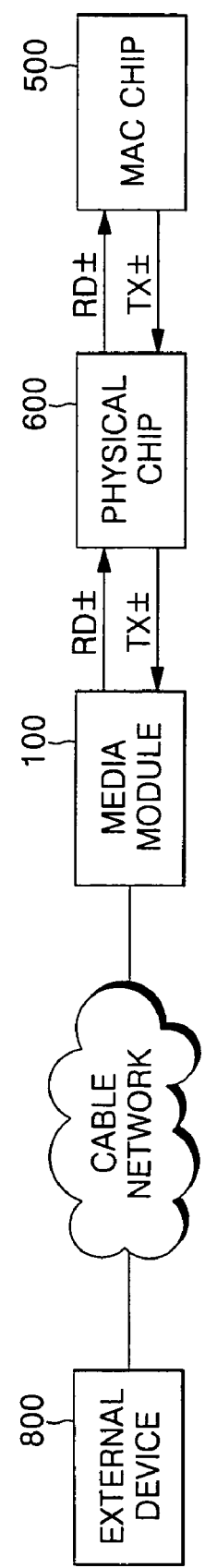
FIG. 4 is a block diagram of a media access control (MAC) interface set-up according to an exemplary embodiment of the present invention.

FIG. 4 is a block diagram of a MAC interface set-up according to an exemplary embodiment of the present invention.

As shown in FIG. 4, the physical chip 600 identifies the type of the media module 100-1 to 100-N mounted in the cage 200-1 to 200-N, and determines whether a duplex, through which the media module 100-1 to 100-N exchanges a frame with an external device 800, is a full type or a half type when the media module 100-1 to 100-N is of a TX type.

When the duplex through which the media module 100-1 to 100-N receives/transmits the frame from/to the external device 800 is of the half type, the physical chip 600 determines a transmission speed at which the frame is exchanged to automatically determine the interface with the MAC chip 500.

That is, the physical chip 600 determines the transmission speed (e.g., 10 M, 100 M, and 1,000 M) for exchanging the frame with the external device 800 connected to the TX media module 100-1 to 100-N, and determines the speed of the interface connected with the MAC chip 500 according to the transmission speed.

Such an interface between the physical chip 600 and the MAC chip 500 may be an interface of the serial Gigabit media independent interface (SGMII) type.

Accordingly, the Ethernet switch/router can be implemented without using a separate MAC interface since the interface between the physical chip 600 and the MAC chip 500 is automatically determined according to the frame exchange speed between the external device 800 and the Ethernet switch/router.

Figure 5:
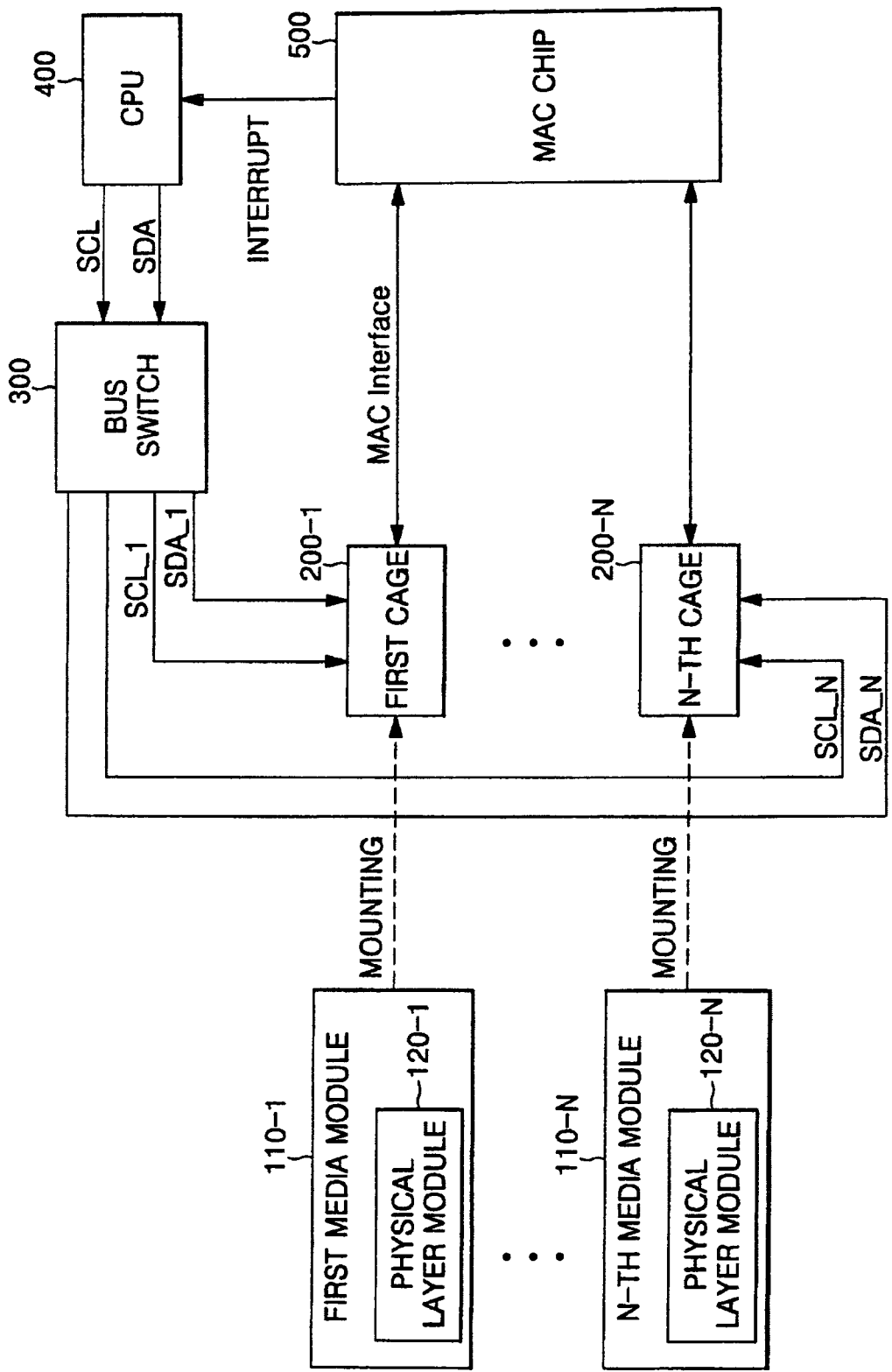
FIG. 5 is a block diagram of an Ethernet switch/router for the UTP/optical integrated network according to another exemplary embodiment of the present invention.

FIG. 5 is a block diagram of an Ethernet switch/router for the unshielded twisted pair (UTP)/optical integrated network according to another exemplary embodiment of the present invention.

As shown in FIG. 5, the Ethernet switch/router is configured such that each media module 110-1 to 110-N mounted in each cage 200-1 to 200-N is connected to the MAC chip 500.

A physical layer module 120-1 to 120-N for performing physical layer processing is embedded in each media module 110-1 to 110-N, and the physical layer module 120-1 to 120-N of each media module 110-1 to 110-N is connected to the MAC chip 500.

When the media module 110-1 to 110-N is mounted in the cage 200-1 to 200-N, the MAC chip 500 generates an interrupt containing the identification information of the cage 200-1 to 200-N and the type information of the media module 110-1 to 110-N, and the CPU 400 transmits a set-up message containing the identification information of the cage 200-1 to 200-N and the operation-related register of the corresponding media module 110-1 to 110-N to the bus switch 300.

The bus switch 300 switches the bus so that the operation-related register is transferred to the corresponding media module 110-1 to 110-N according to the identification information of the cage 200-1 to 200-N contained in the set-up message.

When the media module 110-1 to 110-N is of a TX type, the physical layer module 120-1 to 120-N in the media module 110-1 to 110-N identifies the speed for exchange of the frame with the external device 800 connected via the UTP cable to thereby determine the interface with the MAC chip 500.

Figure 6:
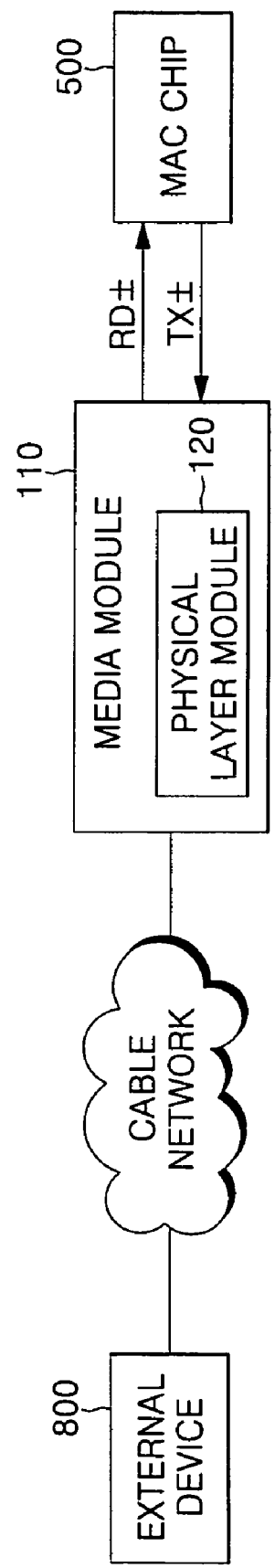
FIG. 6 is a block diagram of a MAC interface set-up according to another exemplary embodiment of the present invention.

FIG. 6 is a block diagram of a MAC interface set-up according to another exemplary embodiment of the present invention.

As shown in FIG. 6, the physical layer module 120-1 to 120-N identifies the type of media module 110-1 to 110-N, and determines whether the duplex through which the media module 110-1 to 110-N exchanges a frame with an external device 800 is of a full type or a half type when the media module 110-1 to 110-N is of a TX type.

When the duplex, through which the media module 110-1 to 110-N receives/transmits the frame from/to the external device 800, is of a half type, the physical layer module 120-1 to 120-N determines the transmission speed for exchange of the frame with the external device 800 to thereby automatically determine the interface with the MAC chip 500.

That is, the physical layer module 120-1 to 120-N determines the transmission speed (e.g., 10 M, 100 M, and 1,000 M) for exchange of the frame with the external device 800 connected to the TX media module 110-1 to 110-N, and determines the speed of the interface to be connected to the MAC chip 500 according to the corresponding transmission speed.

Thus, the Ethernet switch/router can be implemented without using a separate MAC interface since the interface between the media module 110-1 to 110-N and the MAC chip 500 is automatically determined according to the frame exchange speed between the external device 800 and the Ethernet switch/router.

Figure 7:
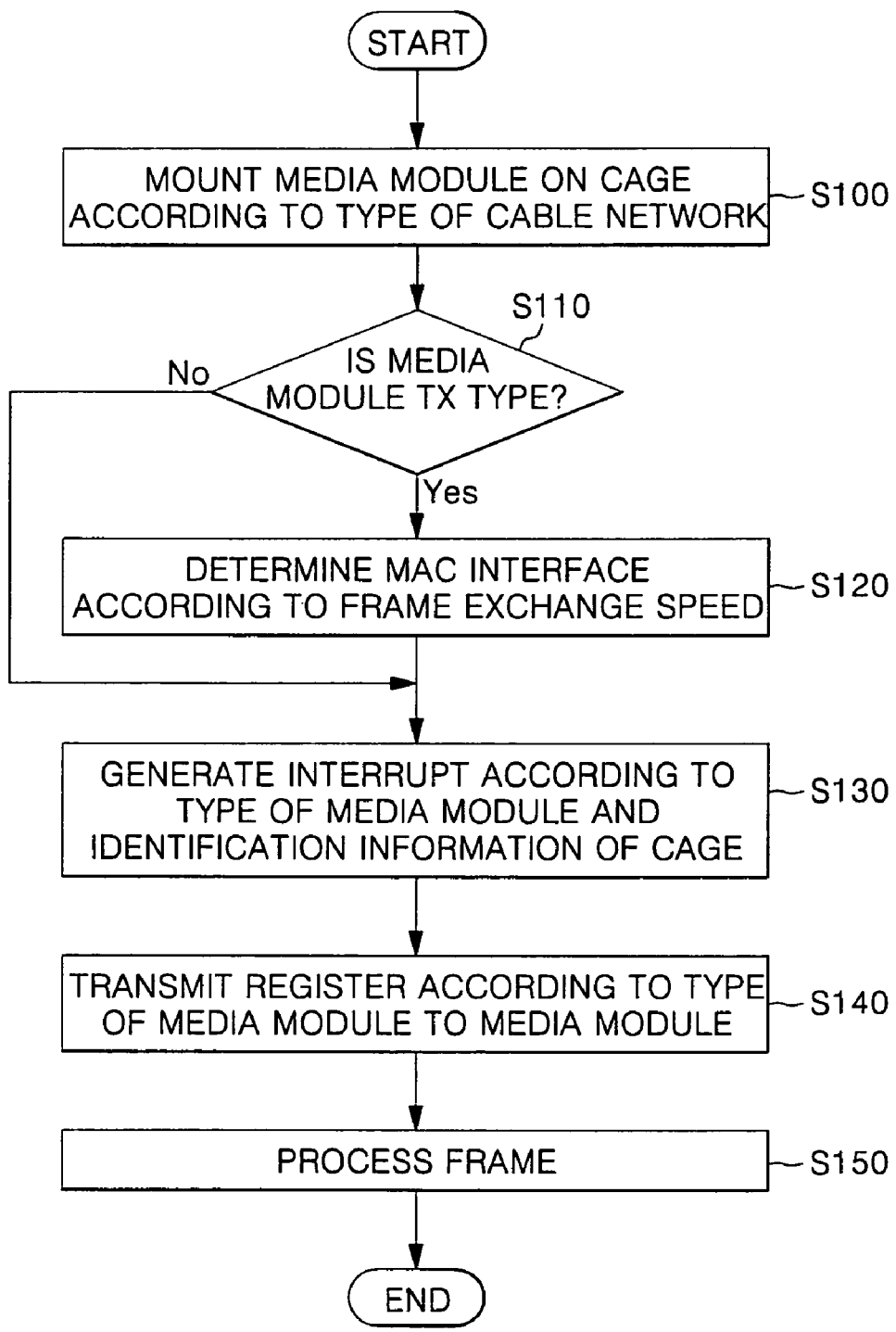
FIG. 7 is a flowchart of a frame processing method in the UTP/optical integrated network according to an exemplary embodiment of the present invention.

FIG. 7 is a flowchart of a frame processing method in the unshielded twisted pair (UTP)/optical integrated network according to an exemplary embodiment of the present invention.

Referring to FIG. 7, the media module 100-1 to 100-N is mounted in at least one cage 200-1 to 200-N according to the type of cable network to be connected by the operator of the Ethernet switch/router (S100).

When there is a TX type media module among the mounted media modules 100-1 to 100-N(S110), the Ethernet switch/router determines the speed of the MAC interface based on the frame exchange speed between the TX type media module 100-1 to 100-N and the external device 800 connected via the UTP cable network, thereby setting up the MAC interface (S120).

At this point, when the duplex, through which the media module 100-1 to 100-N receives/transmits the frame from/to the external device 800, is of a half type, the Ethernet switch/router determines the MAC interface based on the transmission speed for exchange of the fame with the external device 800.

The Ethernet switch/router transmits the operation-related register, which is dependent on the type of the media module 100-1 to 100-N, to the media module 100-1 to 100-N mounted in each cage 200-1 to 200-N.

The physical chip 600 and the MAC chip 500 transmit the type information of the mounted media module 100-1 to 100-N and the identification information of the corresponding cage 200-1 to 200-N to the CPU 400 using the interrupt (S130).

The CPU 400 transmits to the bus switch 300 the operation-related register dependent on the type of the corresponding media module 100-1 to 100-N and the identification information of the corresponding cage 200-1 to 200-N.

The bus switch 300 switches the bus according to the identification information of the cage 200-1 to 200-N so that the operation-related register is transmitted to the corresponding media module 100-1 to 100-N(S140).

The media module 100-1 to 100-N sets up the received operation-related register so as to exchange the frame with the external device 800 through the connected cable network.

The Ethernet switch/router switches or forwards the frame received/transmitted through the media module 100-1 to 100-N(S150).

The above-described embodiments of the present invention have been described by focusing on the Ethernet switch/router which accommodates both the fast Ethernet and the Gigabit Ethernet, but the present invention can be applied to the case where a media module for supporting other networks is mounted in the cage.

As described above, the Ethernet switch/router can accommodate both the UTP cable and the optical cable, and can automatically determine the MAC interface, thereby facilitating design.

In addition, the Ethernet switch/router may comprise a plurality of media modules mounted thereon, and thus it is easy to expand.

While the present invention has been described with reference to exemplary embodiments thereof, it will be understood by those skilled in the art that various changes in form and detail may be made therein without departing from the scope of the present invention as defined by the following claims.

What is claimed is:

1. An Ethernet switch/router for an unshielded twisted pair (UTP)/optical integrated network for selectively switching and forwarding a frame, comprising:

at least one physical chip for physical-layer processing the frame;

at least one media module connected to at least one kind of media; and at least one cage having a socket connected to a corresponding physical chip via a signal bus, and connecting said at least one media module to the corresponding physical chip via the signal bus when said at least one media module is mounted;

wherein said at least one physical chip generates an interrupt providing type information of said at least one media module and identification information of a corresponding said at least one cage when said at least one media module is mounted in the corresponding said at least one cage.

2. The Ethernet switch/router of claim 1, further comprising:

a central processing unit (CPU) for transmitting an operation-related register according to identification information of said at least one cage and type information of said at least one media module mounted in said at least one cage; and a bus switch for switching the signal bus, through which the operation-related register is transferred, to said at least one cage according to the identification information of said at least one cage.

3. The Ethernet switch/router of claim 1, wherein said at least one media module is one of an FX media module connecting with a media of a 100/1000 BASE-TX type and a TX media module connecting with a media of a 10/100/1000 BASE-TX type.

4. The Ethernet switch/router of claim 3, wherein the TX media module converts a signal received from the media of a 10/100/1000 BASE-TX type into a signal to be transmitted to the media of a 100/1000 BASE-TX type.

5. The Ethernet switch/router of claim 1, wherein said at least one media module and said at least one physical chip are connected via an optical interface.

6. The Ethernet switch/router of claim 1, wherein said at least one physical chip identifies a speed for exchange of a frame with an external device to which the mounted said at least one media module forms an Ethernet link so as to determine a speed of a media access control (MAC) interface connected to said at least one MAC physical chip.

7. An Ethernet switch/router for an unshielded twisted pair (UTP)/optical integrated network for selectively switching and forwarding a frame, comprising:

at least one cage having a socket connected to a media access control (MAC) chip via a signal bus and allocated unique identification information;

at least one media module connected to the MAC chip via a MAC interface, and connected to at least one kind of media when mounted in said at least one cage;

a central processing unit (CPU) for transmitting identification information of said at least one cage and an operation-related register according to a type of said at least one media module when said at least one media module is mounted in said at least one cage; and a bus switch for switching a signal bus, through which the operation-related register is transferred, to a corresponding said at least one cage according to the identification information of said at least one cage;

wherein said at least one media module comprises a physical layer module for physical-layer processing a frame to be exchanged via a cable network.

8. The Ethernet switch/router of claim 7, wherein the physical layer module identifies a speed for exchange of a frame with an external device, to which an Ethernet link is connected, so as to determine a speed of a MAC interface connected to the MAC chip.

9. A frame processing method in an Ethernet switch/router for selectively switching and forwarding a frame in a UTP/optical integrated network, said method comprising the steps of:

mounting at least one media module connected to at least one kind of media in at least one cage;

setting-up a media access control (MAC) interface corresponding to a frame exchange speed when said at least one kind of media connected to said at least one media module is a UTP cable network in a physical layer module;

converting, by means of said at least one media module, a signal received from the UTP cable network into an optical signal; and selectively switching or forwarding a frame received from said at least one media module.

10. The frame processing method of claim 9, further comprising the steps of:

generating by said physical layer module an interrupt providing type information of the mounted said at least one media module and identification information of said at least one cage;

transmitting, by means of a CPU to a bus switch, an operation-related register according to the type information and the identification information; and switching, by means of the bus switch, a signal bus to a cage corresponding to the identification information so as to transmit the operation-related register to a corresponding media module.

11. The frame processing method of claim 9, wherein the step of mounting said at least one media module comprises mounting one of an FX media module connected to a 100/1000 BASE-FX type media and a TX media module connected to a 10/100/1000 BASE-TX type media in said at least one cage.

12. The frame processing method of claim 9, wherein the step of converting the signal comprises converting a signal received from a 10/100/1000 BASE-TX type media into a signal to be transmitted to a 100/1000BASE-FX type media.

* * * * *